June 5, 1928.

H. W. SCHWARZ 1,672,347

VALVE STEM SECURING MEANS FOR VEHICLE TIRES

Filed July 3, 1926

Inventor
Henry W. Schwarz,

By Clarence A. O'Brien

Attorney

Patented June 5, 1928.

1,672,347

UNITED STATES PATENT OFFICE.

HENRY W. SCHWARZ, OF MART, TEXAS.

VALVE-STEM-SECURING MEANS FOR VEHICLE TIRES.

Application filed July 3, 1926. Serial No. 120,343.

This invention relates generally to wheels and tires for vehicles, and has more particular reference to a rim securing means for the valve stems of tires, the primary object of the invention residing in the provision of such means that will facilitate the proper attachment of the valve stem to the tire rim in contra-distinction to the felly of the vehicle wheel as to permit of the removal of the tire and rim without requiring the removal of the usual nut from the stem within the wheel felly which is frequently a difficult performance to say nothing of the time required in performing this operation.

The invention further aims to provide a highly novel, simple, and efficient form of dust cap for the portion of the valve stem that projects through the usual opening in the wheel felly so as to permit the tire to be properly inflated when the occasion arises and to also prevent the access of dirt, water, and the like into the valve stem after the tire has been properly disposed upon the wheel.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts throughout the several views.

Figure 1:
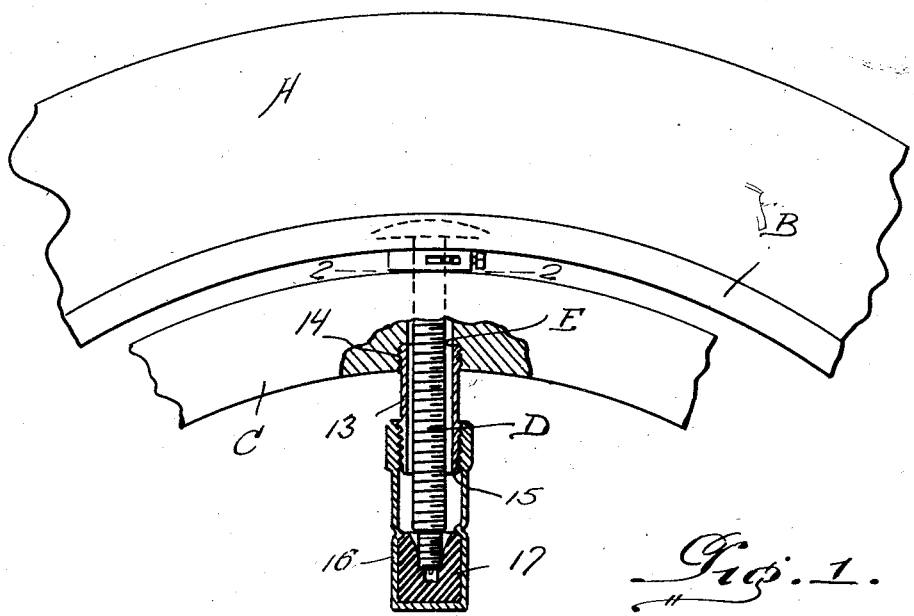
Figure 1 is a fragmentary view partly in side elevation and partly in cross section disclosing a complementary constructed demountable tire rim and wheel felly together with my improved tire stem retaining means and dust cap.
Figure 2:
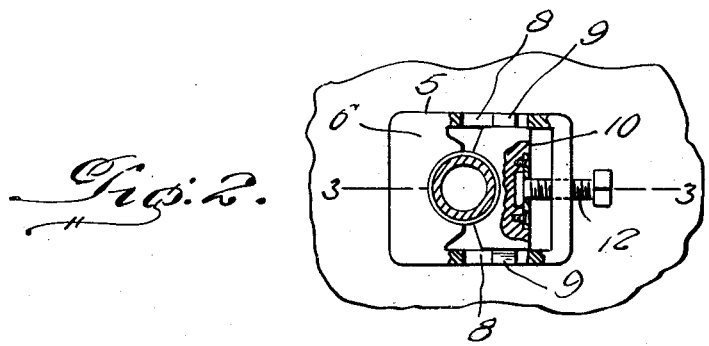
Figure 2 is a detail longitudinal section taken substantially upon the line 2—2 of Figure 1 looking in a direction toward the tire rim for more clearly disclosing the valve stem rim attaching means which is disclosed partly in bottom plan and partly in cross section.
Figure 3:
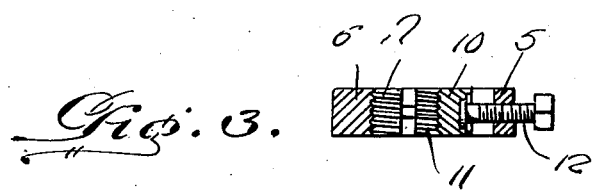
Figure 3 is a detail longitudinal section of the means per se, taken on line 3—3 of Figure 2.

Now having particular reference to the drawings, A designates a conventional pneumatic tire arranged upon the usual demountable rim B for disposition upon the felly C of the automobile wheel. As is well known, the tire A carries the radially inwardly extending valve stem D that will extend through an opening in the center of the rim B as well as a radial opening E in the felly, it being necessary in this instance that the opening E be of considerably greater diameter than the diameter of the valve stem D as clearly disclosed in Figure 1.

In carrying out the present invention I secure the valve stem D directly to the rim B at the under side thereof and this by the provision of a retaining means which consists of a substantially square shaped metallic frame 5 that is formed at one end with a widened portion 6, the inner edge of which is formed with a rounded threaded notch 7. Inwardly of this widened end 6 the side bars of the frame are longitudinally slotted as at 8—8 and movable therein are pins 9—9 upon the opposite ends of a sliding block 10, the inner edge of which is also formed with a threaded notch 11, the threads of which are complementary to the threads of the notch 7 in the widened end portion 6 of the frame. Swivelly associated with the outer edge of the head 10 at the center thereof is the inner end of a screw bolt 12 that is threaded through an opening intermediate the ends of the bar of the frame at the opposite ends of the wide portion so that by turning of the same said head 10 will be moved inwardly or outwardly with respect to the widened portion.

Obviously by disposing this retaining member over the valve stem D prior to the insertion of the same to the opening E in the wheel felly C and then by turning inwardly upon the bolt 12 which is headed at its outer end the sliding head 10 will be caused to tightly engage the stem D for binding the same between the head and widened portion of the frame, thus preventing the movement of the usual inner tube that carries the stem within the tire shoe.

Constructed for use in association with this type of retaining means I provide a highly novel valve stem dust cap that consists of a sleeve 13 of lesser length than that portion of the stem D that projects through the wheel felly and for disposition over said stem as disclosed in Figure 1. The bore of this sleeve is considerably greater in diameter than the external diameter of the stem and the same is externally threaded at its opposite ends as indicated by the reference characters 14 and 15. The inner threaded end of this sleeve is to be threaded within the inner end of the opening E in the wheel felly, the inner end of said opening being complementary threaded for this purpose. After the sleeve has been disposed over the stem as disclosed, a cap 16 internally threaded at its inner end is threaded over the externally threaded outer end of the sleeve for closing the stem to the atmosphere. Within the closed end of the cap is a rubber or other compressible material head 17 that is socketed at its inner end for receiving the open end of the valve stem D for preventing the escape of the air should the usual valve mechanism within the stem cease to function properly.

It will thus be seen that I have provided a highly novel, simple, and efficient form of construction for permitting the securing of the tire valve stem directly to the rim upon which the tire is disposed and also for protecting the stem from dust or water after the tire has been disposed upon the wheel and for preventing the escape of the air from the tire should the valve mechanism cease to function properly.

Having thus described the invention, what I claim as new and desire to secure by Letters Patent is:—

1. In a clamp, a frame-like member, one end portion of the frame being solid and provided with a notch in its inner edge, a block slidable between the sides of the frame, the inner edge of the block having a notch formed therein complementary to the notch in the inner edge of the solid portion of the frame, and means for actuating the sliding block, said means comprising a bolt threaded through the free end of the frame, the inner end thereof being swivelly connected to the adjacent end of the sliding block, and an actuating head on the outer end of the bolt.

2. In a clamp of the class described, a frame-like member, one end portion thereof being solid and provided with a threaded notch in its inner edge, a block slidable between the sides of the frame, the inner edge of the block having a threaded notch formed therein complementary to the threaded notch in the inner edge of the solid portion of the frame, means for actuating the sliding block, and cooperating guide means for the sliding block between the latter and the sides of the frame, said guide means comprising pins projecting laterally from the opposite sides of the sliding block, the adjacent sides of the frame having slots formed therein, in which said pins are operable.

3. In a clamp, a frame-like member, one end portion of the frame being solid and provided with a notch in its inner edge, a block confined between the sides of the frame and adapted for slidable movement, the inner edge of the block having a notch formed therein complementary to the notch in the inner edge of the solid portion of the frame, means for actuating the sliding block, and a pin and slot arrangement between the ends of the slidable block and the respective sides of the frame for guiding the block in its sliding movement.

In testimony whereof I affix my signature.

HENRY W. SCHWARZ.